United States Patent
Ross et al.

(10) Patent No.: US 7,756,062 B2
(45) Date of Patent: *Jul. 13, 2010

(54) PERIODICALLY RECONFIGURED NETWORKS

(75) Inventors: John Anderson Fergus Ross, Niskayuna, NY (US); Amit Bhavanishankar Kulkarni, Clifton Park, NY (US); John Erik Hershey, Ballston Lake, NY (US); Michael James Hartman, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 183 days.

This patent is subject to a terminal disclaimer.

(21) Appl. No.: 12/016,116

(22) Filed: Jan. 17, 2008

(65) Prior Publication Data

US 2008/0175170 A1     Jul. 24, 2008

Related U.S. Application Data

(60) Provisional application No. 60/885,873, filed on Jan. 19, 2007.

(51) Int. Cl.
*H04L 12/28* (2006.01)
*G06F 15/173* (2006.01)

(52) U.S. Cl. .................................. 370/254; 709/241
(58) Field of Classification Search .................. None
See application file for complete search history.

(56) References Cited

U.S. PATENT DOCUMENTS 5,491,690 A * 2/1996 Alfonsi et al. .............. 370/404
5,577,030 A * 11/1996 Oki et al. .................... 370/351
6,278,799 B1   8/2001 Hoffman
6,456,620 B1 * 9/2002 Wang et al. ................. 370/388

(Continued)

FOREIGN PATENT DOCUMENTS

WO     03/001742 A1     1/2003

OTHER PUBLICATIONS

Ross et al. Staged-Topologies for Directional Antenna Networks. Electronics Letter. 2 pages. vol. 42. No. 2. Jan. 19, 2006.*

(Continued)

*Primary Examiner*—Ayaz R Sheikh
*Assistant Examiner*—Timothy J Weidner
(74) *Attorney, Agent, or Firm*—Marsh Fischmann & Breyfogle LLP

(57) ABSTRACT

Methodologies for determining one or more staged topologies for a communication network, communication networks implementing one or more staged topologies, and systems for determining one or more staged topologies for a communication network are provided. In one embodiment, a method of determining a staged topology for a communication network including a plurality of nodes includes identifying a plurality of topologies comprising different subsets of available communication links among the nodes, associating a connection matrix with each identified topology, establishing one or more sequences of topologies using the identified topologies, multiplying the connection matrices associated with the topologies in each sequence of topologies to obtain a sequenced connection matrix corresponding with each sequence of topologies, multiplying each sequenced connection matrix by a weighting matrix to obtain a total cost matrix corresponding with each sequence of topologies, and selecting one of the sequences of topologies as the staged topology based on the total cost matrices corresponding with each sequence of topologies.

20 Claims, 13 Drawing Sheets

U.S. PATENT DOCUMENTS

| | | |
|---|---|---|
| 6,497,656 B1 | 12/2002 | Evans et al. |
| 6,510,139 B1 * | 1/2003 | Yoshida .................. 370/238 |
| 6,668,012 B1 | 12/2003 | Hershey et al. |
| 6,999,423 B2 * | 2/2006 | Call et al. ............... 370/238 |
| 7,042,846 B2 * | 5/2006 | Bauer ..................... 370/238 |
| 7,362,974 B2 * | 4/2008 | De Patre et al. .......... 709/239 |
| 7,580,382 B1 * | 8/2009 | Amis et al. .............. 370/310 |
| 7,653,030 B2 * | 1/2010 | Arrakoski et al. ........ 370/338 |
| 2002/0042274 A1 * | 4/2002 | Ades ..................... 455/445 |
| 2002/0150182 A1 | 10/2002 | Dogan et al. |
| 2002/0187770 A1 * | 12/2002 | Grover et al. ............ 455/403 |
| 2003/0198213 A1 * | 10/2003 | Jensen et al. ............ 370/351 |
| 2004/0063468 A1 | 4/2004 | Frank |
| 2004/0166812 A1 | 8/2004 | Lumelsky |
| 2004/0230323 A1 | 11/2004 | Glanzer et al. |
| 2004/0246906 A1 * | 12/2004 | Hardy .................... 370/252 |
| 2005/0068902 A1 * | 3/2005 | Rath ..................... 370/256 |
| 2006/0087986 A1 * | 4/2006 | Dube et al. .............. 370/255 |
| 2007/0280133 A1 * | 12/2007 | Ramanan et al. .......... 370/254 |
| 2008/0056163 A1 * | 3/2008 | Chan et al. .............. 370/255 |
| 2008/0062891 A1 * | 3/2008 | Van der Merwe et al. ... 370/254 |
| 2008/0175171 A1 | 7/2008 | Ross et al. |
| 2008/0175173 A1 | 7/2008 | Ross et al. |

OTHER PUBLICATIONS

Benhamida et al. The Capacity Enhancement of the DCS Network by the Use of Switch-Beam Antennas. Universal Personal Communications. Record, 5th IEEE International Conference on, vol. 1. Sep. 29-Oct. 2 pp. 463-467. 1996.

Chattopadhyay et al. An Innovative Technique for Backbone Network Design. IEEE Transactions on Systems, Man and Cybernetics. vol. 19, No. 5. pp. 1122-1132. Sep./Oct. 1989.

Elbatt et al. On the Channel Reservation Schemes for Ad-Hoc Networks Utilizing Directional Antennas. Wireless Personal Multimedia Communications. The 5th International Symposium on, vol. 2, pp. 766-770. Oct. 27-30, 2002.

Grace et al. An Approach for Modestly Directional Communications in Mobile Ad Hoc Networks. Computer Communications and Networks. ICCCCN 2003. Proceedings. the 12th International Conference on, pp. 377-384, Oct. 20-22, 2003.

Lau et al. Antenna Selection in a Multi-Sector Packet Radio Network. Bostonicc. Conference record. World Prosperity Through Communications, IEEE International Conference on, pp. 188-192, vol. 1, Jun. 11-14, 1989.

Macedo et al. Antenna-Sector Time-Division Muliple Access for Broadband Indoor Wireless Systems. IEEE Journal on Selected Areas in Communications. vol. 66, No. 16. pp. 937-952. Aug. 1998.

Ramanathan et al. Ad Hoc Networking With Directional Antennas: A Complete System Solution. IEEE Journal on Selected Areas in Communication. vol. 23, No. 3. pp. 496-506. Mar. 2005.

* cited by examiner

PERIODICALLY RECONFIGURED NETWORKS

RELATED APPLICATION INFORMATION

This application claims priority from U.S. Provisional Application Ser. No. 60/885,873, entitled "PERIODICALLY RECONFIGURED NETWORKS" filed on Jan. 19, 2007, which is incorporated by reference herein in its entirety.

FIELD OF THE INVENTION

The present invention relates generally to communication networks, and more particularly to topology determination in communications networks.

BACKGROUND OF THE INVENTION

A communication network can be considered to be comprised of a number of individual nodes with communication links among the nodes. Typically, each node within the network is not directly linked with every other node in the network, and data being communicated from an initial node to a destination node makes a number of hops within the network via one or more intermediary nodes. The communication links between nodes may be wireless links (e.g., radio frequency (RF), microwave, free-space optical) in the case of a wireless network, wired links (e.g., telephone wire, coaxial cable, optical fiber) in the case of a wired network, or a combination of wireless and wired links in the case of a mixed type communication network. The active communication links among the nodes during a particular time period define a particular topology for the network, and a given network may have multiple possible topologies depending upon which links are active during different time periods.

One field of communications network research is topology determination. One goal of topology determination research is determining the network topology that provides the best engineering solution for a given set of nodes, links between nodes, quality of service considerations, and network traffic patterns. This goal is relevant to both wireless and wired networks as new fixed topologies may need to be determined to account for network transformations. Intervals between topology updates may be relatively short (e.g., milliseconds to minutes) in wireless mobile networks and relatively long (e.g., days to months) in wired networks.

SUMMARY OF THE INVENTION

The present invention recognizes that a fixed topology where the communication links among the nodes of a communication network remain static may not always provide the most effective solution. Accordingly, methodologies of determining one or more staged topologies for a communication network, communication networks implementing one or more staged topologies, and systems for determining one or more staged topologies for a communication network are provided. A staged topology includes a sequence of one or more topologies where each topology represents a different subset of available communication links among the nodes. A staged topology providing a given level of network connectivity (e.g. full connectivity among the nodes) may provide for a more efficient communication network than a fixed topology providing the same level of network connectivity. Such methodologies, networks and systems also facilitate the occasional or periodic reconfiguration of the links between nodes in a communication network such as a wireless communication network, a wired communication network, or a combined wireless and wired communication network.

According to one aspect, a method of determining a staged topology for a communication network including a plurality of nodes includes a number of process steps including identifying a plurality of topologies comprising different subsets of available communication links among the nodes, and generating a staged topology for the network, where the staged topology comprises a sequence of at least one of the identified topologies, and where information is communicatable among the nodes within the network via communication links arranged in accordance with the topologies included in the staged topology. Generation of the staged topology may be accomplished by associating a connection matrix with each identified topology, establishing one or more sequences of topologies using the identified topologies, multiplying the connection matrices associated with the topologies in each sequence of topologies to obtain a sequenced connection matrix corresponding with each sequence of topologies, multiplying each sequenced connection matrix by a weighting matrix to obtain a total cost matrix corresponding with each sequence of topologies, and selecting one of the sequences of topologies as the staged topology based on the total cost matrices corresponding with each sequence of topologies. The aforementioned use of matrix techniques are just one exemplary manner of generating the staged topology and other techniques such as, for example, the use of clustering lists or hierarchical approaches may be utilized. In addition to such steps, the method may also include, prior to the step of multiplying each sequenced connection matrix by a weighting matrix, the steps of determining which sequences of topologies produce a fully connected communication network, and choosing only the sequenced connection matrices corresponding with the sequences of topologies that produce a fully connected communication network for further consideration. The method may also include the steps of periodically updating the staged topology for the communication network, and/or updating the staged topology for the communication network upon occurrence of an update triggering event.

According to another aspect, a communication network implementing a staged topology includes a plurality of separate nodes, a plurality topologies comprising different subsets of available communication links among the nodes, and a staged topology comprising a sequence of at least one of the topologies, wherein information is communicatable among the nodes within the network via communication links arranged in accordance with the topologies included in the staged topology. The staged topology may, for example, be selected from one or more sequences of topologies, wherein each sequence of topologies corresponds with a sequenced connection matrix obtained by multiplying connection matrices associated with the topologies in each sequence of topologies. One of the sequences of topologies may, for example, be selected as the staged topology based on total cost matrices corresponding with each sequence of topologies, wherein the total cost matrices are obtained by multiplying each sequenced connection matrix by a weighting matrix. In addition to the aforementioned use of matrix techniques in selecting the staged topology, other techniques such as, for example, the use of clustering lists or hierarchical approaches may be utilized. The sequence of topologies that is selected as the staged topology may be one that produces a fully connected communication network. Further, the staged topology for the communication network may be periodically updated and/or the staged topology for the communication network may be updated upon occurrence of an update triggering event.

According to one more aspect, a system for implementing a staged topology in a communication network including a plurality of nodes includes means for identifying a plurality of topologies comprising different subsets of available communication links among the nodes, means for associating a connection matrix with each identified topology, means for establishing one or more sequences of topologies using the identified topologies, means for multiplying the connection matrices associated with the topologies in each sequence of topologies to obtain a sequenced connection matrix corresponding with each sequence of topologies, means for multiplying each sequenced connection matrix by a weighting matrix to obtain a total cost matrix corresponding with each sequence of topologies, and means for selecting one of the sequences of topologies as the staged topology based on the total cost matrices corresponding with each sequence of topologies. The system may also include means for determining which sequences of topologies produce a fully connected communication network, and means for choosing only the sequenced connection matrices corresponding with the sequences of topologies that produce a fully connected communication network for further consideration. The system may further include means for periodically updating the staged topology for the communication network and/or means for updating the staged topology for the communication network upon occurrence of an update triggering event. Each of the foregoing means of the system may be implemented in a number of different forms. For example, one or more of the foregoing means may comprise a computer program product executable by a computer processor that may be included in controller means for controlling operation of the communication network.

In accordance with another aspect, as the number of nodes in the network increases it may become impractical to compute all possible valid sets. In this regard, it is possible to match the RF bandwidth to the size of the practical set. There are many ways to involve a larger number of nodes. For example, a hierarchical structure of clustered nodes is one approach in networking. The methodologies, networks and systems of the present invention could be applied to a hierarchical structure by optimizing data flow within each cluster and also across cluster-heads. An alternative proposed here is to create a flat structure by assigning one frequency band per computable set size. Each node has access to all frequency bands. A frequency assignment table states which node-set operates on which frequency band. A geographically uniform distribution of frequency assignments is expected to maximize the throughput per frequency (to maximize beam separation). Each cluster of nodes is now of a size small enough that a valid sequenced topology can be computed for that set. Each cluster has an associated clusterhead. The clusterheads of each cluster can communicate to form a virtual overlay network on the existing physical network. The staged topology algorithm can then be applied to this virtual network of clusterheads to compute a feasible fully-connected topology over time. If the number of clusterheads in the network is still large enough to make the computation impractical, then the clustering algorithm can be re-applied to create a hierarchical structure.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 1:
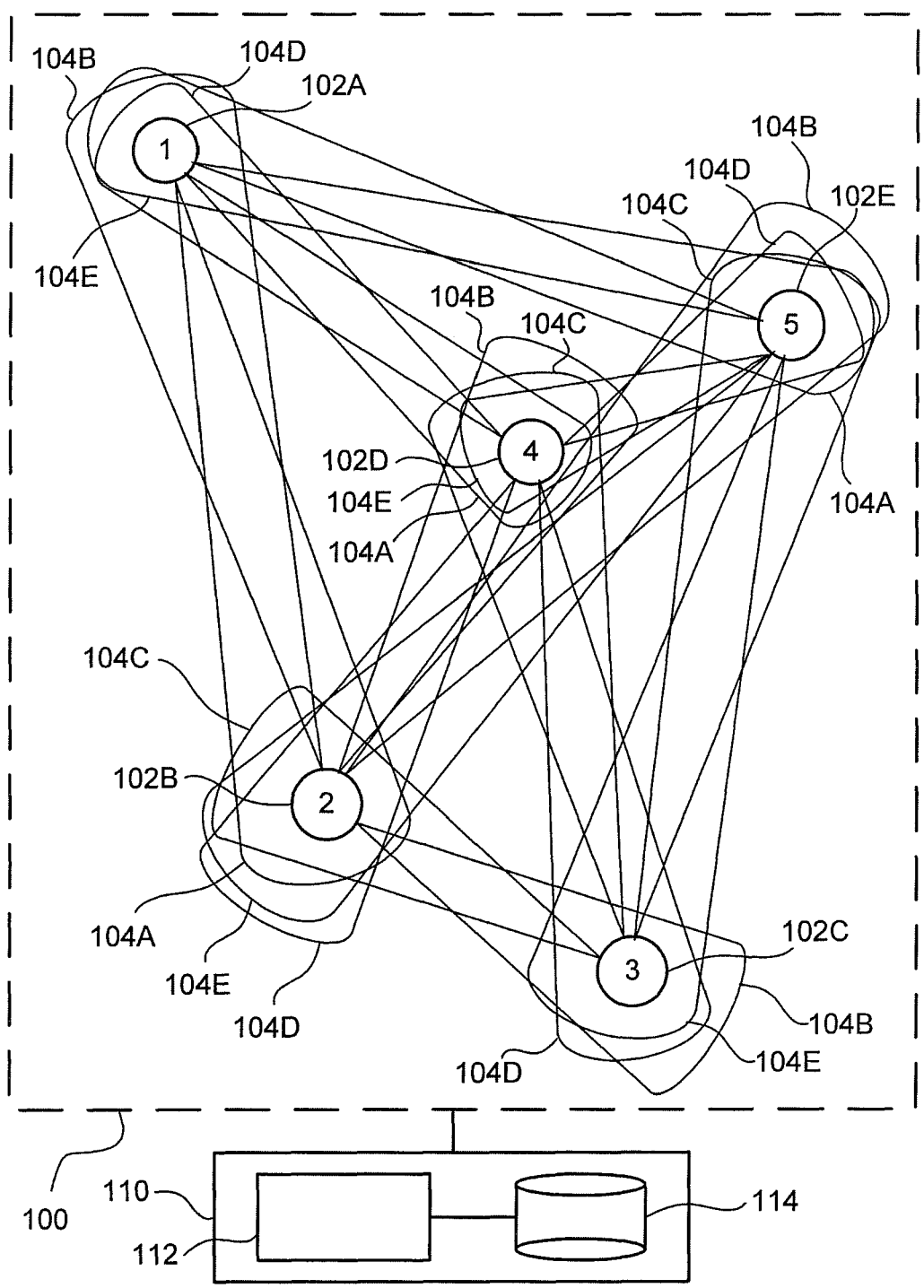
FIG. 1 shows one embodiment of a multi-node wireless communication network in which a staged topology may be implemented.

FIG. 1 illustrates one embodiment of a multi-node communication network 100. The multi-node communication network 100 includes five nodes 102A-102E. In other embodiments, the multi-node communication network 100 may include fewer or more nodes than the five nodes 102A-102E illustrated.

The multi-node communication network 100 is a wireless communication network. In this regard, communication among the nodes 102A-102E is accomplished using over-the-air signals such as, for example, RF, microwave, or free-space optical signals. However, in other embodiments, one or more portions, or even the entirety, of the network 100 may be a wired network in which communication among one or more of the nodes 102A-102E is accomplished using, for example, electrical or optical signals transmitted via, for example, telephone wire, coaxial cable, or optical fiber.

Each node 102A-102E includes a steerable directional beam antenna that permits each node 102A-102E to transmit a respective signal beam 104A-104E in the direction of one or more other nodes 102A-102E within the network 100. In this regard, the directional antenna at each node 102A-102E may, for example, be electronically pointable (e.g., a phased array antenna) and/or electromechanically pointable (e.g., mounted on a motorized mast). In other embodiments, non-steerable directional antennas that are manually pointed, broadbeam or omni-directional antennas may be employed at one or more of the nodes 102A-102E. The signal beams 104A-104E from each node 102A-102E may be of the same beamwidth, or depending upon characteristics of the directional antennas, the signal beams 104A-104E may be of varying beamwidths.

In the exemplary network 100, every node 102A-102E is not able to link directly with every other node 102A-102E due, for example, to transmitter power limitations, receiver sensitivity limitations, atmospheric conditions, geographic obstacles or some combination thereof. For example, the first node 102A is able to communicate directly with the second, fourth and fifth nodes 102B, 102D, and 102E, and the second, third, fourth and fifth nodes 102B-102E are able to communicate directly with one another. However, the first node 102A cannot communicate directly with the third node 102C, and therefore no signal beams are shown from the first node 102A to the third node 102C and from the third node 102C to the first node 102A. Thus, one or more hops via intermediary nodes 102B, 102D, 102E may be utilized to transmit information between the first node 102A and the third node 102C. This may be accomplished via a sequence of network topologies (also referred to herein as a staged topology) in which the information is communicated over a series of communication links among the nodes 102A-102E existing during different periods of time. Since numerous different topologies are possible, determining one or more desired staged topologies for particular network conditions is desirable.

As illustrated, the communication network 100 may be operated under the direction of a controller unit 110 that controls operation of the communication network. Controller unit 110 may, for example, provide control signals to the nodes 102A-102E instructing the nodes 102A-102E to transmit their respective signal beams 104A-104E in particular directions at particular times in order to establish the communication links among the nodes 102A-102E for one or more topologies in a sequence corresponding with a desired current staged topology for the communication network 100. In other embodiments, the communication network 100 may be operated in accordance with a distributed control scheme implemented among some or all of the nodes 102A-102E. Such distributed control may be utilized in place of or in addition to the central controller unit 110.

Figure 2:
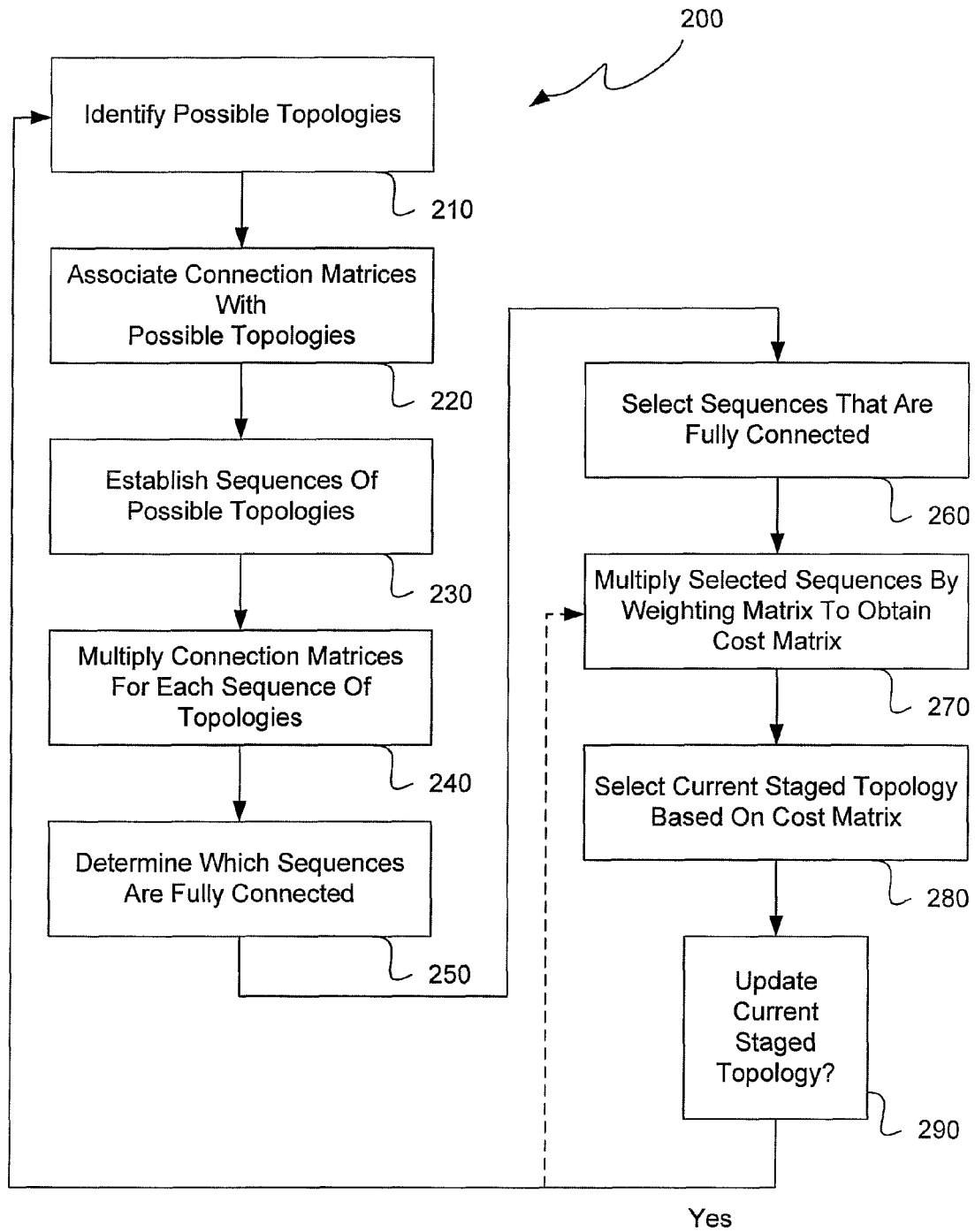
FIG. 2 shows one embodiment of a method of determining a staged topology in a communication network.

Controller unit 110 may include a processing device 112 that determines the desired current staged topology. The processing device 112 may determine the desired current staged topology in accordance with a method such as shown in FIG. 2. In this regard, a method such as shown in FIG. 2 may be implemented in computer readable program code stored on a data storage device 114 (e.g., a hard drive, a flash memory, an optical disc) coupled to processing device 112 that is executable by the processing device 112. Processing device 112 may, for example, include devices such as, for example, a general purpose microprocessor, a field programmable gate array (FPGA), an application specific integrated circuit, or some combination thereof FIG. 2 shows the steps involved in one embodiment of a method 200 of determining a staged topology in a communication network such as the wireless communication network 100 of FIG. 1.

In step 210 of the method 200, possible topologies representing different subsets of available communication links among the nodes that satisfy design link criteria are identified. In this regard, design link criteria may include, for example, meeting a specified information rate at a given packet error rate.

Exemplary possible topologies 300A-300H for a five node wireless communications network 100 such as shown in FIG. 1 are illustrated in FIGS. 3A-3H. The topologies shown in FIGS. 3A-3H are only a subset of the possible topologies, and other possible topologies in addition to the eight possible topologies shown in FIGS. 3A-3H may exist for a five node wireless communications network such as shown in FIG. 1. In this regard, assuming that links between any two of the five nodes satisfy design link criteria, there are as many as $2^{N(N-1)/2}-1=1023$ possible topologies for a five node network 100 such as shown in FIG. 1. Eliminating topologies including links that do not satisfy design link criteria reduces the number of possible topologies to be considered further.

Referring again to FIG. 2, in step 220 a connection matrix is associated with each possible topology identified in step 210. In this regard, the connection matrices may include a number of numerical elements $c_{ij}$ indexed by row i and column j where i represents the first of a pair of nodes and j represents the second of a pair of nodes. The numerical value in cell ij of a connection matrix may be a first value (e.g., 1) when there is a communication link from node i to node j in the associated possible topology and a second value (e.g., 0) when there is not a communication link from node i to node j in the associated possible topology. For example, the following connection matrices $C_A$, $C_B$, $C_C$, $C_D$, $C_E$, $C_F$, $C_G$, and $C_H$, respectively, may be associated with the possible topologies 300A-300H shown in FIGS. 3A-3H, respectively:

$$C_A = \begin{bmatrix} 1 & 0 & 0 & 1 & 0 \\ 0 & 1 & 1 & 0 & 0 \\ 0 & 1 & 1 & 0 & 0 \\ 1 & 0 & 0 & 1 & 0 \\ 0 & 0 & 0 & 0 & 1 \end{bmatrix} \quad C_B = \begin{bmatrix} 1 & 0 & 0 & 0 & 0 \\ 0 & 1 & 0 & 0 & 1 \\ 0 & 0 & 1 & 1 & 0 \\ 0 & 0 & 1 & 1 & 0 \\ 0 & 1 & 0 & 0 & 1 \end{bmatrix} \quad C_C = \begin{bmatrix} 1 & 0 & 0 & 0 & 0 \\ 0 & 1 & 0 & 1 & 0 \\ 0 & 0 & 1 & 0 & 1 \\ 0 & 1 & 0 & 1 & 0 \\ 0 & 0 & 1 & 0 & 1 \end{bmatrix}$$

$$C_D = \begin{bmatrix} 1 & 1 & 0 & 0 & 0 \\ 1 & 1 & 0 & 0 & 0 \\ 0 & 0 & 1 & 1 & 0 \\ 0 & 0 & 1 & 1 & 0 \\ 0 & 0 & 0 & 0 & 1 \end{bmatrix} \quad C_E = \begin{bmatrix} 1 & 1 & 0 & 0 & 0 \\ 1 & 1 & 0 & 0 & 0 \\ 0 & 0 & 1 & 1 & 1 \\ 0 & 0 & 1 & 1 & 1 \\ 0 & 0 & 1 & 1 & 1 \end{bmatrix} \quad C_F = \begin{bmatrix} 1 & 0 & 0 & 1 & 0 \\ 0 & 1 & 1 & 0 & 1 \\ 0 & 1 & 1 & 0 & 0 \\ 1 & 0 & 0 & 1 & 1 \\ 0 & 1 & 0 & 1 & 1 \end{bmatrix}$$

$$C_G = \begin{bmatrix} 1 & 1 & 0 & 1 & 1 \\ 1 & 1 & 1 & 0 & 0 \\ 0 & 1 & 1 & 0 & 0 \\ 1 & 0 & 0 & 1 & 1 \\ 1 & 0 & 0 & 1 & 1 \end{bmatrix} \quad C_H = \begin{bmatrix} 1 & 1 & 0 & 0 & 0 \\ 1 & 1 & 0 & 0 & 0 \\ 0 & 0 & 1 & 1 & 1 \\ 0 & 0 & 1 & 1 & 0 \\ 0 & 0 & 1 & 0 & 1 \end{bmatrix}$$

In step 230 of method 200, one or more sequences of topologies are established using the possible topologies identified in step 220. In this regard, a sequence of topologies may include two or more stages wherein each stage corresponds with one of the possible topologies of the communication network. The sequences may be referenced by the order of their associated connection matrices within the sequence. For the five node communication network 100 of FIG. 1, one exemplary two stage sequence may include the topology 300A of FIG. 3A as a first stage and the topology 300B of FIG. 3B as a second stage, and such sequence is referred to as sequence $C_A C_B$. An exemplary three stage sequence may include the topology 300A of FIG. 3A as a first stage, the topology 300B of FIG. 3B as a second stage and the topology 300C of FIG. 3C as a third stage, and such sequence is referred to as sequence $C_A C_B C_C$. An exemplary four stage sequence may include the topology 300A of FIG. 3A as a first stage, the topology 300B of FIG. 3B as a second stage, the topology 300C of FIG. 3C as a third stage and the topology 300D of FIG. 3D as a fourth stage, and such sequence is referred to as sequence $C_A C_B C_C C_D$. Another exemplary two stage sequence may include the topology 300E of FIG. 3E as a first stage and the topology 300F of FIG. 3F as a second stage, and such sequence is referred to as sequence $C_E C_F$. One more exemplary two stage sequence may include the topology 300G of FIG. 3G as a first stage and the topology 300H of FIG. 3H as a second stage, and such sequence is referred to as sequence $C_G C_H$. There may be numerous other two, three, four, or more stage sequences established in step 230 using the eight exemplary topologies 300A-300H shown in FIGS. 3A-3H as well as other possible topologies identified in step 210 in addition to the exemplary topologies 300A-300H shown in FIGS. 3A-3H.

In step 240 of method 200, the connection matrices associated in step 220 with the topologies included in each sequence of topologies established in step 230 are matrix multiplied by one another. This may be done in accordance with the order in which the topologies are arranged in each sequence of topologies. The result obtained is a connection matrix corresponding with each sequence of topologies. Such connection matrix resulting from the multiplication operation(s) may be referred to as a sequenced connection matrix. In one example, for sequence $C_A C_B$, matrix $C_A$ is multiplied by matrix $C_B$ and the following result is obtained:

$$C_A C_B = \begin{bmatrix} 1 & 0 & 1 & 1 & 0 \\ 0 & 1 & 1 & 1 & 1 \\ 0 & 1 & 1 & 1 & 1 \\ 1 & 0 & 1 & 1 & 0 \\ 0 & 1 & 0 & 0 & 1 \end{bmatrix}$$

In another example, for sequence $C_A C_B C_C$, matrix $C_A$ is multiplied by matrix $C_B$ and then further multiplied by matrix $C_C$ to obtain the following result:

$$C_A C_B C_C = \begin{bmatrix} 1 & 1 & 1 & 1 & 1 \\ 0 & 2 & 2 & 2 & 2 \\ 0 & 2 & 2 & 2 & 2 \\ 1 & 1 & 1 & 1 & 1 \\ 0 & 1 & 1 & 1 & 1 \end{bmatrix}$$

In a further example, for sequence $C_A C_B C_C C_D$, matrix $C_A$ is multiplied by matrix $C_B$, then further multiplied by matrix $C_C$ and then further multiplied by matrix $C_D$ to obtain the following result:

$$C_A C_B C_C C_D = \begin{bmatrix} 2 & 2 & 2 & 2 & 1 \\ 2 & 2 & 4 & 4 & 2 \\ 2 & 2 & 4 & 4 & 2 \\ 2 & 2 & 2 & 2 & 1 \\ 1 & 1 & 2 & 2 & 1 \end{bmatrix}$$

In one more example, for sequence $C_E C_F$, matrix $C_E$ is multiplied by matrix $C_F$ and the following result is obtained:

$$C_E C_F = \begin{bmatrix} 1 & 1 & 1 & 1 & 1 \\ 1 & 1 & 1 & 1 & 1 \\ 1 & 2 & 1 & 2 & 2 \\ 1 & 2 & 1 & 2 & 2 \\ 1 & 2 & 1 & 2 & 2 \end{bmatrix}$$

In yet another example, for sequence $C_G C_H$, matrix $C_G$ is multiplied by matrix $C_H$ and the following result is obtained:

$$C_G C_H = \begin{bmatrix} 2 & 2 & 2 & 1 & 1 \\ 2 & 2 & 1 & 1 & 1 \\ 1 & 1 & 1 & 1 & 1 \\ 1 & 1 & 2 & 1 & 1 \\ 1 & 1 & 2 & 1 & 1 \end{bmatrix}$$

There may be more sequenced connection matrix results obtained in step 240 than the five exemplary results set forth above depending upon the number of sequenced topologies established in step 230.

In step 250 of method 200, a determination is made regarding which sequences of topologies produce a fully connected communication network. The determination of which sequenced topologies, if any, produce fully connected communication networks may be made on the basis of the individual elements appearing in their corresponding sequenced connection matrices obtained in step 240. In this regard, where a numerical value of 1 is used when there is a communication link from node i to node j and a numerical value of 0 is used when there is not a communication link from node i to node j in the connection matrices associated with the topologies included in the sequenced topology, a particular sequenced topology may be considered fully connected if there are only nonzero elements included in its corresponding sequenced connection matrix. For example, the sequenced connection matrices corresponding with sequences $C_A C_B C_C C_D$, $C_E C_F$, and $C_G C_H$ illustrated above have only nonzero elements and thus sequences $C_A C_B C_C C_D$, $C_E C_F$, and $C_G C_H$ produce fully connected communication networks; whereas, the sequenced connection matrices corresponding with sequences $C_A C_B$ and $C_A C_B C_C$ illustrated above include a number zero elements and thus sequences $C_A C_B$ and $C_A C_B C_C$ do not produce fully connected communication networks. Where values other than 0 and 1 are used to indicate the absence or presence of a communication link between a given pair of nodes in the connection matrices, different criteria may need to be applied to the sequenced connection matrices in order to determine which sequenced topologies produce fully connected networks and which do not produce fully connected networks.

In step 260 of method 200, the sequenced connection matrices corresponding with the sequences of topologies that produce a fully connected communication network are selected for further consideration. For example, of the five sequences $C_A C_B$, $C_A C_B C_C$, $C_A C_B C_C C_D$, $C_E C_F$, and $C_G C_H$ illustrated above, only sequences $C_A C_B C_C C_D$, $C_E C_F$, and $C_G C_H$ would be selected for further consideration.

In step 270 of method 200, each sequenced connection matrix selected for further processing in step 260 is multiplied by a weighting matrix. This results in a total cost matrix corresponding with each sequence of topologies that produces a fully connected communication network. The weighting matrix may include a number of elements $w_{ij}$ that represent relative costs of the communication links from node i to node j. The weighting matrix may or may not be the same size as the sequenced connection matrices, but it should include the appropriate number or rows or columns in order to allow for the matrix multiplication operation depending upon whether the weighting matrix appears before or after the sequenced connection matrix in the multiplication operation. One example of a weighting matrix W for a five node communication network 100 such as shown in FIG. 1 is as follows:

$$W = \begin{bmatrix} 0 & 2 & 5 & 2 & 5 \\ 2 & 0 & 1 & 1 & 1 \\ 5 & 1 & 0 & 1 & 1 \\ 2 & 1 & 1 & 0 & 1 \\ 5 & 1 & 1 & 1 & 0 \end{bmatrix}$$

In the exemplary weighting matrix, numerical values of 0 have been used for elements $c_{ij}$ where i=j based on the assumption that there is no cost associated with an intra-node communication link. Minimal numerical values (e.g., 1) have been used for communication links among nodes 3, 4 and 5 based on the assumption that such communication links are low-cost in terms of, for example, transmitter power requirements, signal-to-noise ratio, and receiver sensitivity requirements due to, for example, the relatively close geographic proximity of such nodes within the communication network 100. Larger numerical values (e.g., 2) have been used for communication links between nodes 1 and 2 and 1 and 4 based on the assumption that such communication links are higher-cost in terms of, for example, transmitter power requirements, signal-to-noise ratio, and receiver sensitivity requirements due to, for example, the relatively increased geographic proximity of such nodes within the communication network 100. The largest numerical values (e.g., 5) have been used for communication links between nodes 1 and 3 and 1 and 5 based on the assumption that such communication links are the highest-cost (if not impossible altogether) in terms of, for example, transmitter power requirements, signal-to-noise ratio, and receiver sensitivity requirements due to, for example, the relatively distant geographic proximity of such nodes within the communication network 100. A weighting matrix such as weighting matrix W may be referred to as a non-equal weighting matrix since different weights are used for some of the communication links.

Non-equal weighting matrix W and the basis for the numerical values included therein are just one example, and many other weighting matrices may be utilized with the elements included therein being of various values based on various factors. For example, a weighting matrix with equally weighted links may be used when, for example, it is desired to consider all possible links to be of equal cost. One example of such an equal weighting matrix W' is as follows (with intra-node links assumed to be no cost):

$$W' = \begin{bmatrix} 0 & 1 & 1 & 1 & 1 \\ 1 & 0 & 1 & 1 & 1 \\ 1 & 1 & 0 & 1 & 1 \\ 1 & 1 & 1 & 0 & 1 \\ 1 & 1 & 1 & 1 & 0 \end{bmatrix}$$

Multiplying exemplary fully connected sequenced topology $C_A C_B C_C C_D$; by exemplary weighting matrices W or W', the following total cost matrices are obtained:

$$C_A C_B C_C C_D W = \begin{bmatrix} 23 & 9 & 15 & 9 & 16 \\ 42 & 14 & 18 & 12 & 20 \\ 42 & 14 & 18 & 12 & 20 \\ 23 & 9 & 15 & 9 & 16 \\ 21 & 7 & 9 & 6 & 10 \end{bmatrix}$$

$$C_A C_B C_C C_D W' = \begin{bmatrix} 7 & 7 & 7 & 7 & 8 \\ 12 & 12 & 10 & 10 & 12 \\ 12 & 12 & 10 & 10 & 12 \\ 7 & 7 & 7 & 7 & 8 \\ 6 & 6 & 5 & 5 & 6 \end{bmatrix}$$

Multiplying exemplary fully connected sequenced topology $C_E C_F$ by exemplary weighting matrices W or W', the following total cost matrices are obtained:

$$C_E C_F W = \begin{bmatrix} 14 & 5 & 8 & 5 & 8 \\ 14 & 5 & 8 & 5 & 8 \\ 23 & 7 & 11 & 7 & 10 \\ 23 & 7 & 11 & 7 & 10 \\ 23 & 7 & 11 & 7 & 10 \end{bmatrix} \quad C_E C_F W' = \begin{bmatrix} 4 & 4 & 4 & 4 & 4 \\ 4 & 4 & 4 & 4 & 4 \\ 7 & 6 & 7 & 6 & 6 \\ 7 & 6 & 7 & 6 & 6 \\ 7 & 6 & 7 & 6 & 6 \end{bmatrix}$$

Multiplying exemplary fully connected sequenced topology $C_G C_H$ by exemplary weighting matrices W or W', the following total cost matrices are obtained:

$$C_G C_H W = \begin{bmatrix} 21 & 8 & 14 & 9 & 15 \\ 16 & 7 & 14 & 8 & 14 \\ 14 & 5 & 8 & 5 & 8 \\ 19 & 6 & 8 & 6 & 9 \\ 19 & 6 & 8 & 6 & 9 \end{bmatrix} \quad C_G C_H W' = \begin{bmatrix} 6 & 6 & 6 & 7 & 7 \\ 5 & 5 & 6 & 6 & 6 \\ 4 & 4 & 4 & 4 & 4 \\ 5 & 5 & 4 & 5 & 5 \\ 5 & 5 & 4 & 5 & 5 \end{bmatrix}$$

In step 280 of method 200, one of the sequences of topologies is selected as the current staged topology based on the total cost matrices obtained in step 270 corresponding with each sequence of topologies that produces a fully connected communication network. One way of making the selection is to sum all of the individual elements $c_{ij}$ included in each total cost matrix corresponding with each sequence of topologies that produces a fully connected communication network and then compare the sums obtained. For example, if non-equal weighting matrix W is used, the sum of the elements of total cost matrix $C_A C_B C_C C_D W$ is "409", the sum of the elements of total cost matrix $C_E C_F W$ is "254", and the sum of the elements of total cost matrix $C_G C_H W$ is "262". In this example where non-equal weighting matrix W was used in step 270, fully connected sequenced topology $C_E C_F$ may be selected in step 280 as the current staged topology based on it having the smaller sum of corresponding total cost matrix elements. In another example, if equal weighting matrix W' is used, the sum of the elements of total cost matrix $C_A C_B C_C C_D W'$ is "212", the sum of the elements of total cost matrix $C_E C_F W'$ is "136", and the sum of the elements of total cost matrix $C_G C_H W'$ is "128". In this example where equal weighting matrix W' was used in step 270, fully connected sequenced topology $C_GC_H$ may be selected as the current staged topology based on it having the smaller sum of corresponding total cost matrix elements.

The foregoing basis for selecting the current staged topology by summing the elements of the corresponding total cost matrices and choosing the sequence with the smallest sum is only one example, and the total cost matrices may be compared in other manners and the selection of the current staged topology may be made in other manners. For example, either of fully connected sequenced topologies $C_EC_F$ or $C_GC_H$ may be selected as the current staged topology over fully connected sequenced topology $C_AC_BC_CC_D$ since sequenced topologies $C_EC_F$ and $C_GC_H$ both require fewer stages (e.g., two as opposed to four) to achieve a fully connected network. In this regard, multiplication of the sequenced connection matrices by a weighting matrix may not be necessary to the selection of the current staged topology. However, selecting among two or more sequenced topologies having the same number of stages may require further efforts such as the multiplication of their corresponding sequenced connection matrices by a weighting matrix and summing of the elements of the total cost matrices obtained.

In step 290 of method 200, an inquiry is made as to whether or not the current staged topology should be updated. In this regard, it may be desirable to periodically update the current staged topology (e.g., once every millisecond to once every few minutes) in, for example, a wireless mobile network where the position of one or more nodes within the network relative to the other nodes may be changing, where one or more new nodes are occasionally joining the network, or one or more existing nodes are occasionally leaving the network. Likewise, it may be desirable to update the current staged topology based on the occurrence of an update triggering event that changes network conditions such as for example, a change in the relative position of one or more nodes within the network, the addition of one or more new nodes to the network, or the removal of one or more existing nodes from the network.

Regardless of whether updates are undertaken periodically or as a result of a triggering event, when an update is desired, the method 200 may proceed to step 210 as shown or one of the subsequent steps of method 200 if appropriate. For example, where no new nodes have been added to the network, no existing nodes have been removed from the network, or the relative geographic position of the network nodes have only been minimally altered such that all previously possible topologies remain possible, the connection matrices are the same and the fully connected sequences are the same, it may be possible to return only to step 270 and use a revised weighting matrix that includes revised costs associated with the various communication links.

Figure 4A:
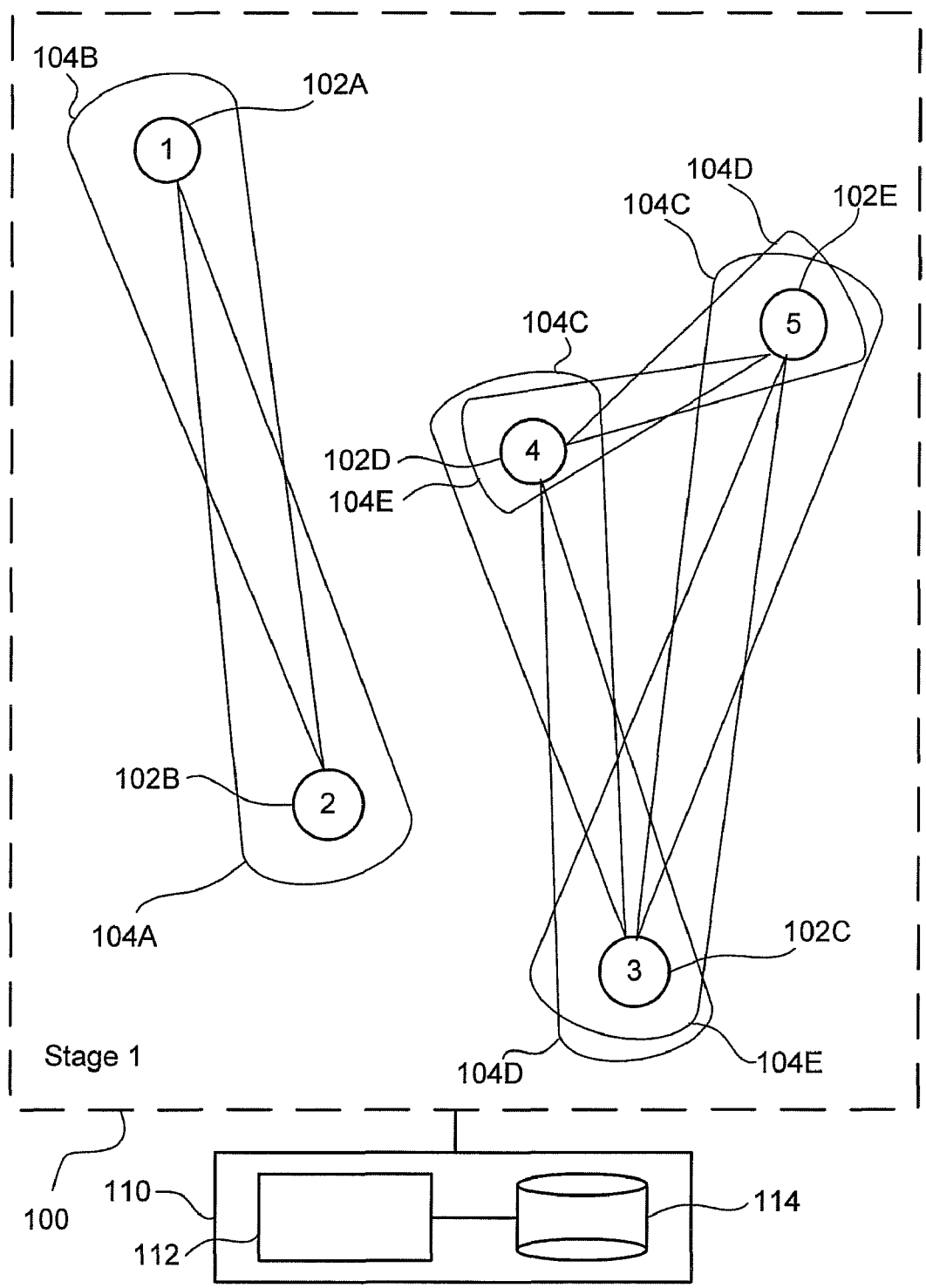
FIGS. 4A-4B show first and second stages of an exemplary staged topology for a wireless communication network such as shown in FIG. 1.
Figure 4B:
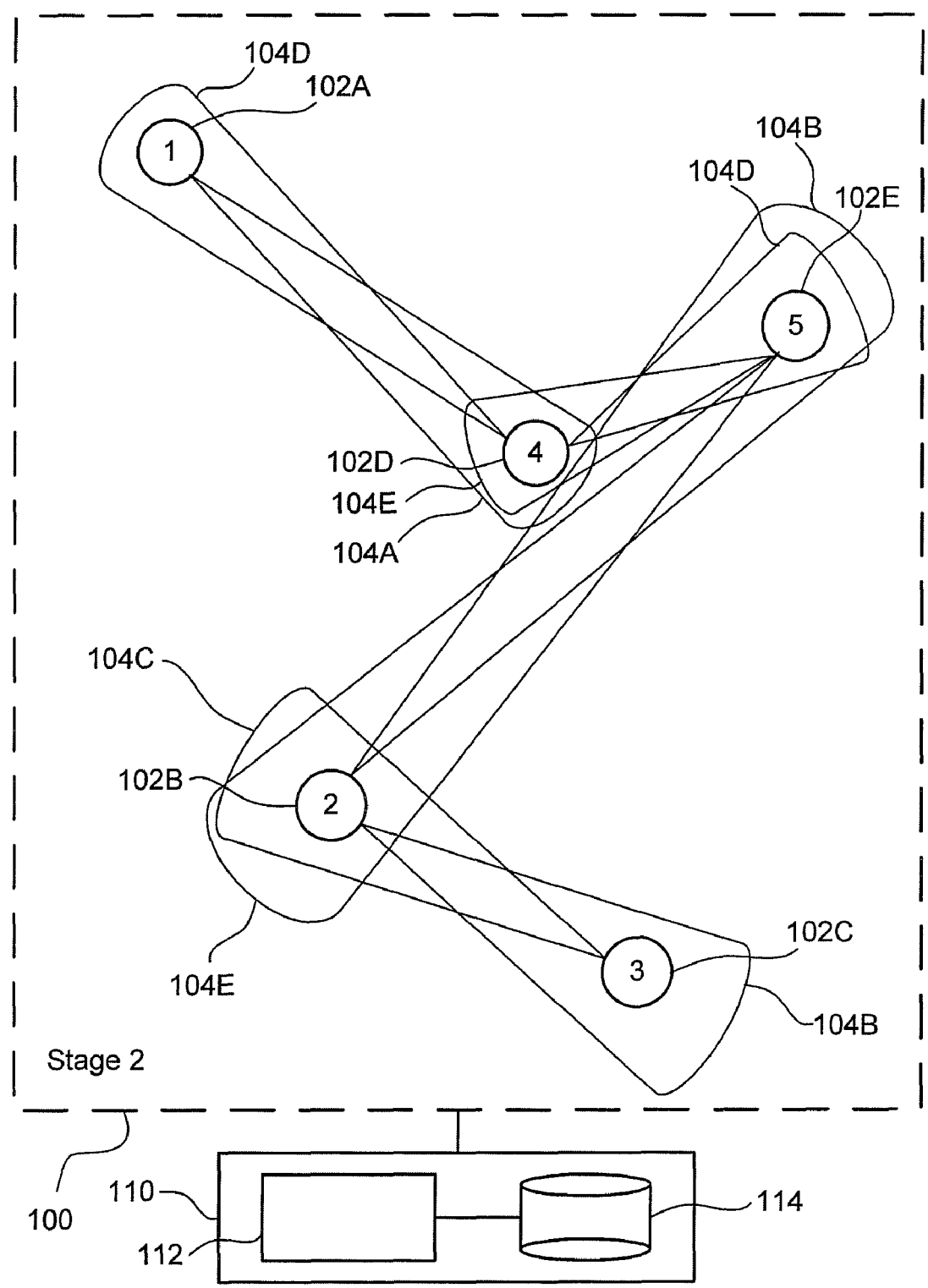

FIGS. 4A-4B show first and second stages of the fully connected sequenced topology $C_EC_F$ that may be selected in step 280 as the current staged topology for the exemplary communication network of FIG. 1 if, for example, non-equal weighting matrix W is employed in step 270 of method 200. In stage 1 (FIG. 4A), the first and second nodes 102A, 102B communicate with one another via signal beams 104A, 104B, and the third, fourth and fifth nodes 102C-102E communicate with one another via signal beams 104C-104E. In the stages of a sequenced topology, where multiple signal beams emanate from a particular node (e.g., the two signal beams 104C from node 102C in FIG. 4A), each beam from the same node may generally carry different information, although it is possible for the same information to be carried on more than one of the beams. In stage 2 (FIG. 4B), the first and fourth nodes 102A, 102D communicate with one another via signal beams 104A, 104D, the fourth and fifth nodes 102D, 102E communicate with one another via signal beams 104D, 104E, the fifth and second nodes 102E, 102B communicate with one another via signal beams 104E, 104B, and the second and third nodes 102B, 102C communicate with one another via signal beams 104B, 104C. Stage 1 may be established under the direction of the controller unit 110 and maintained for a first period of time. Then stage 2 may be established under the direction of the controller unit 110 for a second period of time, which may be shorter, longer or the same duration as the first period of time. Thereafter, the stages of the current staged topology are repeated until the processing device 112 determines that an updated staged topology is desired.

Figure 4C:
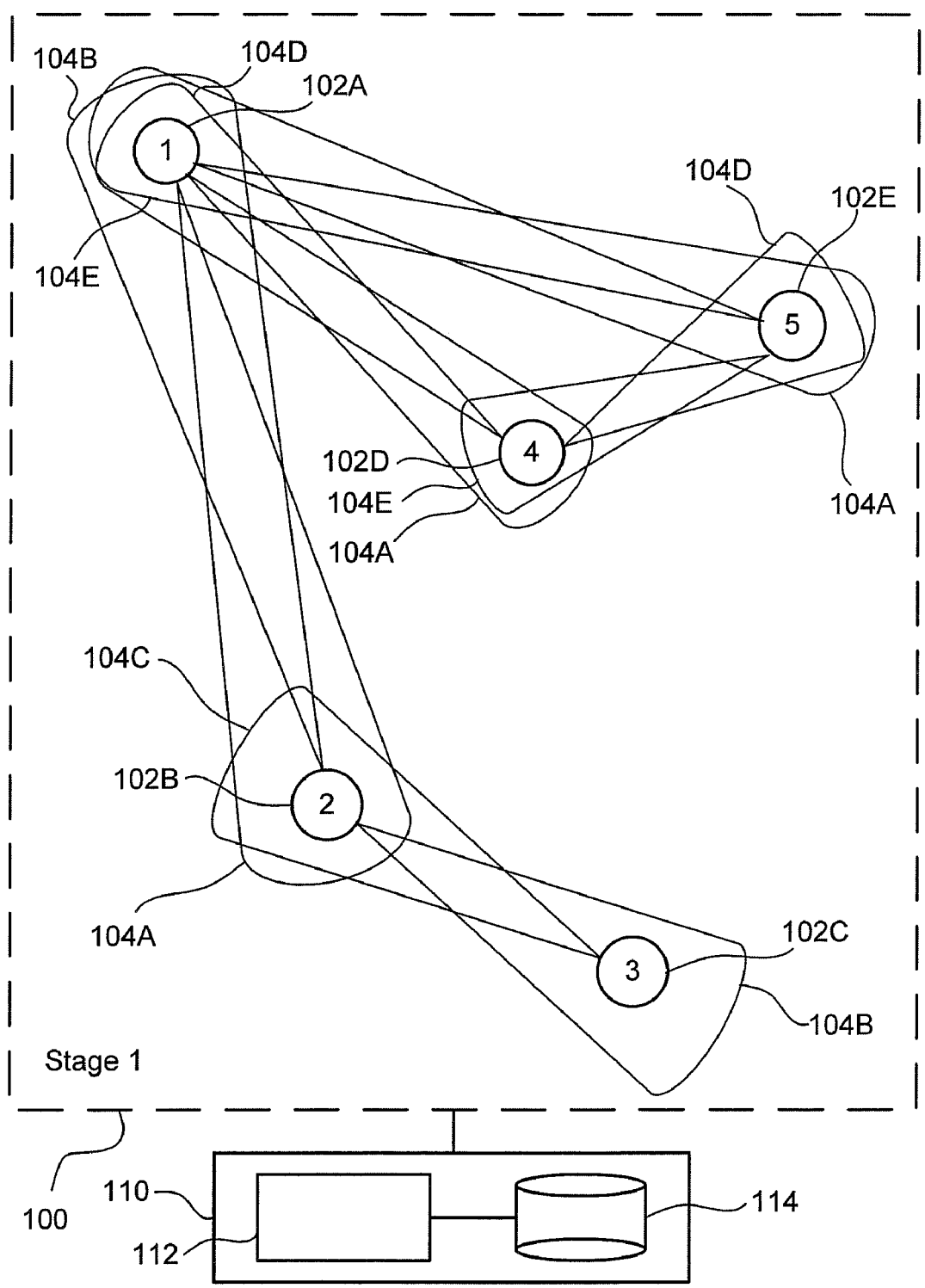
FIGS. 4C-4D show first and second stages of another exemplary staged topology for a wireless communication network such as shown in FIG. 1
Figure 4D:
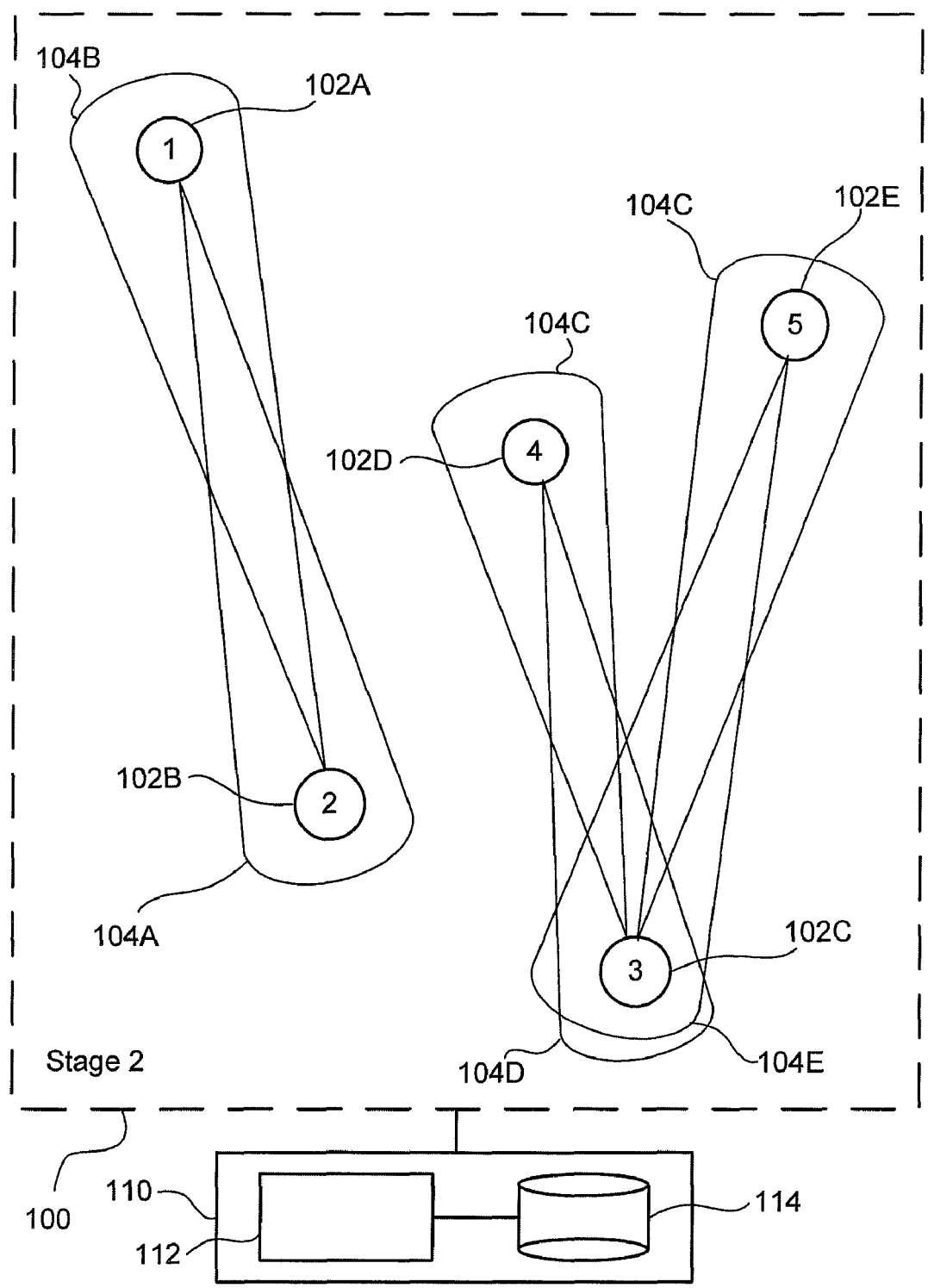

FIGS. 4C-4D show first and second stages of the fully connected sequenced topology $C_GC_H$ that may be selected in step 280 as the current staged topology for the exemplary communication network of FIG. 1 if equal weighting matrix W' is employed in step 270 of method 200. In stage 1 (FIG. 4C), the first node 102A communicates with the second, fourth, and fifth nodes 102B, 102D and 102E via signal beams 104A, 104B, 104D and 104E, the fourth and fifth nodes 102D, 102E communicate with one another via signal beams 104D, 104E, and the second and third nodes 102B, 102C communicate with one another via signal beams 104B, 104C. In stage 2 (FIG. 4D), the first and second nodes 102A, 102B communicate with one another via signal beams 104A, 104B, the third and fourth nodes 102C, 102D communicate with one another via signal beams 104C, 104D, and the third and fifth nodes 102C, 102E communicate with one another via signal beams 104C, 104E. Stage 1 may be established under the direction of the controller unit 110 and maintained for a first period of time. Then stage 2 may be established under the direction of the controller unit 110 for a second period of time, which may be shorter, longer or the same duration as the first period of time. Thereafter, the stages of the current staged topology are repeated until the processing device 112 determines that an updated staged topology is desired.

In exemplary network 100 shown in FIG. 1, it is assumed that the number of available antenna beams at each node is one fewer than the total number of nodes in the network 100. Thus, each node 102A-102E is assumed to have four available antenna beams capable of transmitting signals in the direction of the other four nodes 102A-102E in the exemplary five-node network 100. In practice, it may not be practical to utilize antennas with such extensive multi-beaming capabilities due, for example, to cost or technical infeasibility. For example, the nodes 102A-102E may have antennas that are capable of only single-beaming or dual-beaming during the same stage. Thus, it may be desirable when determining a staged topology for a network to consider restrictions regarding the number of beams available at each node.

Figure 5:
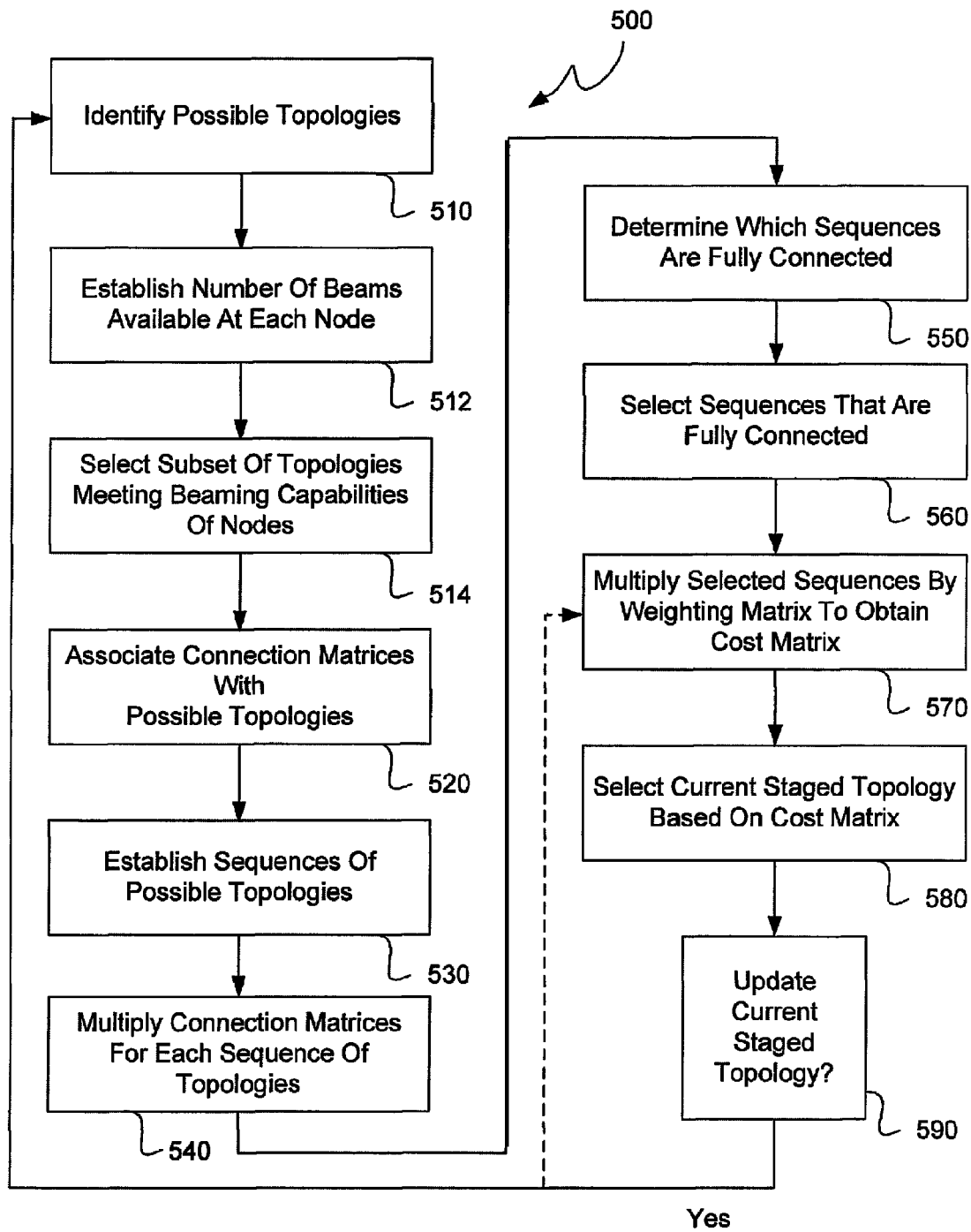
FIG. 5 shows another embodiment of a method of determining a staged topology in a communication network.

FIG. 5 shows another embodiment of a method 500 of determining a staged topology in a communication network wherein the number of signal beams available at each node is limited. The method 500 of FIG. 5 proceeds in a similar manner to the method 200 of FIG. 2. In this regard, steps 510, 520, 530, 540, 550, 560, 570, 580 and 590 of method 500 correspond with steps 210, 220, 230, 240, 250, 260, 270, 280 and 290, respectively, of method 200, and such corresponding steps may be performed in a manner similar to that as described in connection with method 200 shown in FIG. 2. However, in the method 500 of FIG. 5, additional steps 512 and 514 are undertaken following step 510 in which possible topologies of the network are identified.

In step 512 of method 500, the number of beams available at each node in the network is established. In this regard, the number of beams available at each node may be the same for every node in the network (e.g., every node may have two available beams), or the number of beams available at each node in the network may be different for different nodes (e.g., some nodes may have two available beams while others have only one available beam).

The number of beams available at each node in the network may be established in various manners. In accordance with one exemplary manner, the number of beams available at each node may be set in advance of performing the method 500. For example, where the method 500 is implemented in computer readable program code stored on a data storage device 114 coupled to a processing device 112 that is included in a controller unit 110 such as shown in FIG. 1, the computer readable program code may be written to set the number of beams available at each node to a fixed number. Such fixed number may be based on information known or assumptions made regarding the beaming capabilities of each node at the time of writing the code. In accordance with another exemplary manner, the number of beams available at each node in the network may be established during performance of the method 500. For example, where the method 500 is implemented in computer readable program code stored on a data storage device 114 coupled to a processing device 112 that is included in a controller unit 110 such as shown in FIG. 1, the computer readable program code may query a user for one or more inputs regarding the number of beams available at each node, retrieve the number of beams available at each node from a data file stored on the data storage device 114 that may be periodically updated in accordance with current network node capabilities, or obtain information regarding the number of beams available at each node from the network itself (e.g., from the individual nodes).

Figure 3A:
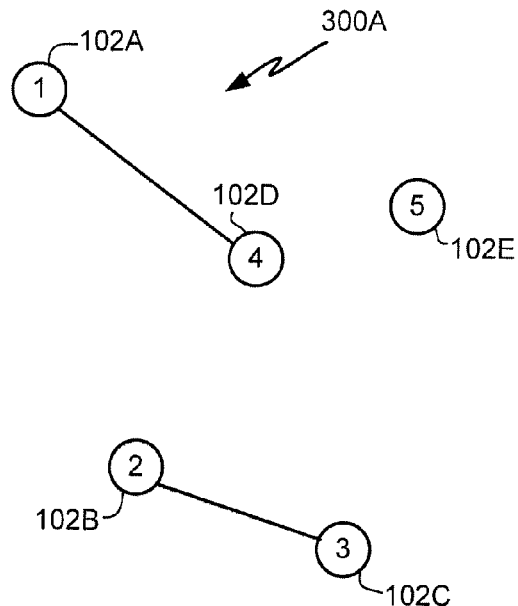
FIGS. 3A-3H show exemplary possible topologies for a five node wireless communication network such as shown in FIG. 1.
Figure 3B:
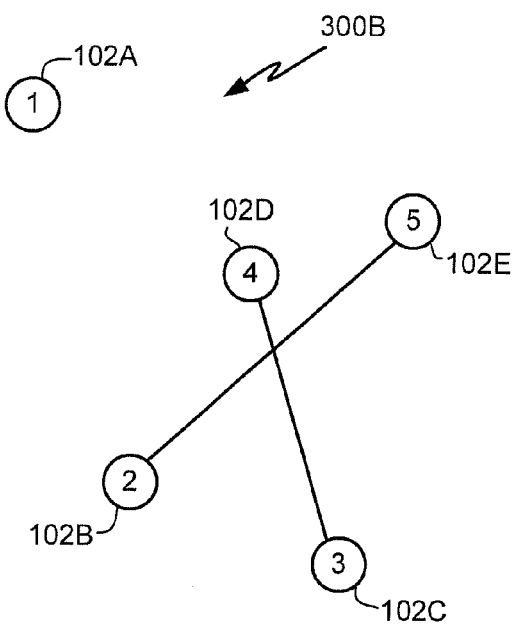
Figure 3C:
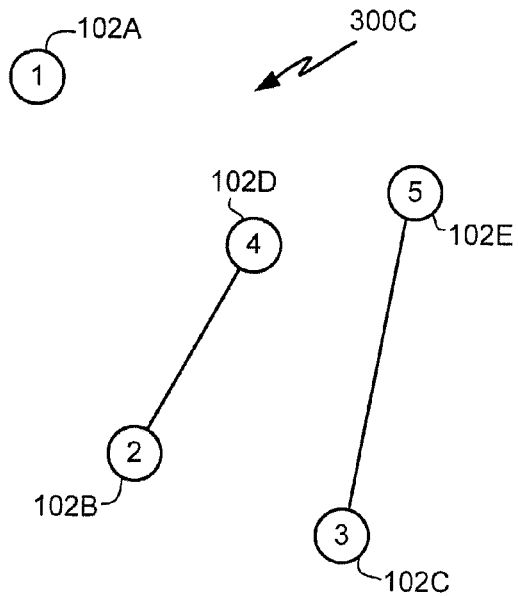
Figure 3D:
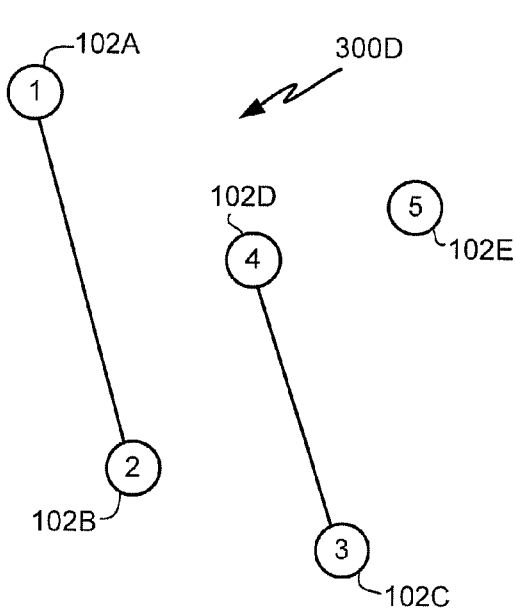
Figures 3E, 3F:
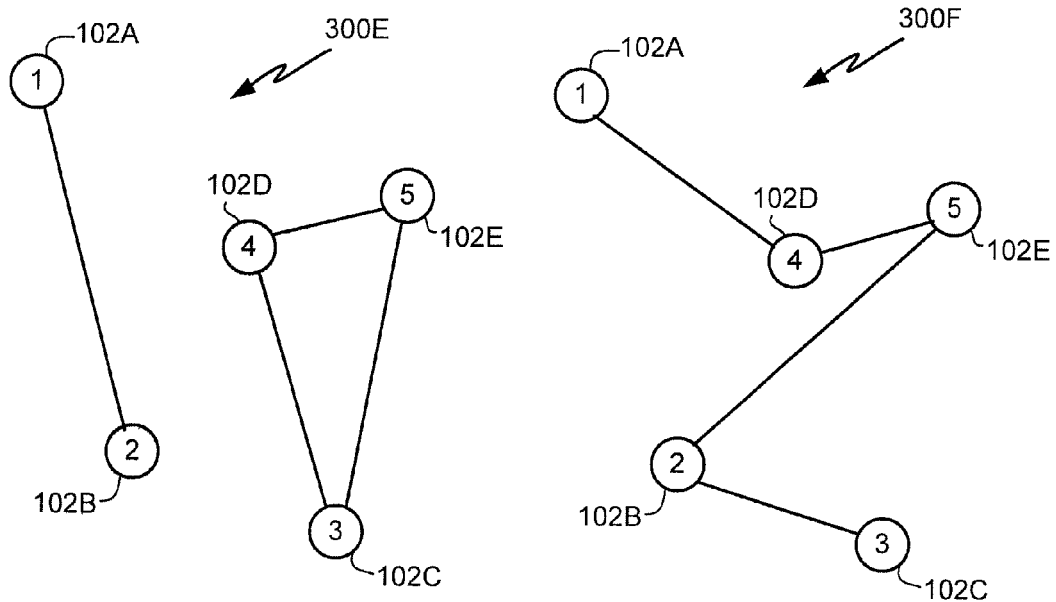
Figures 3G, 3H:
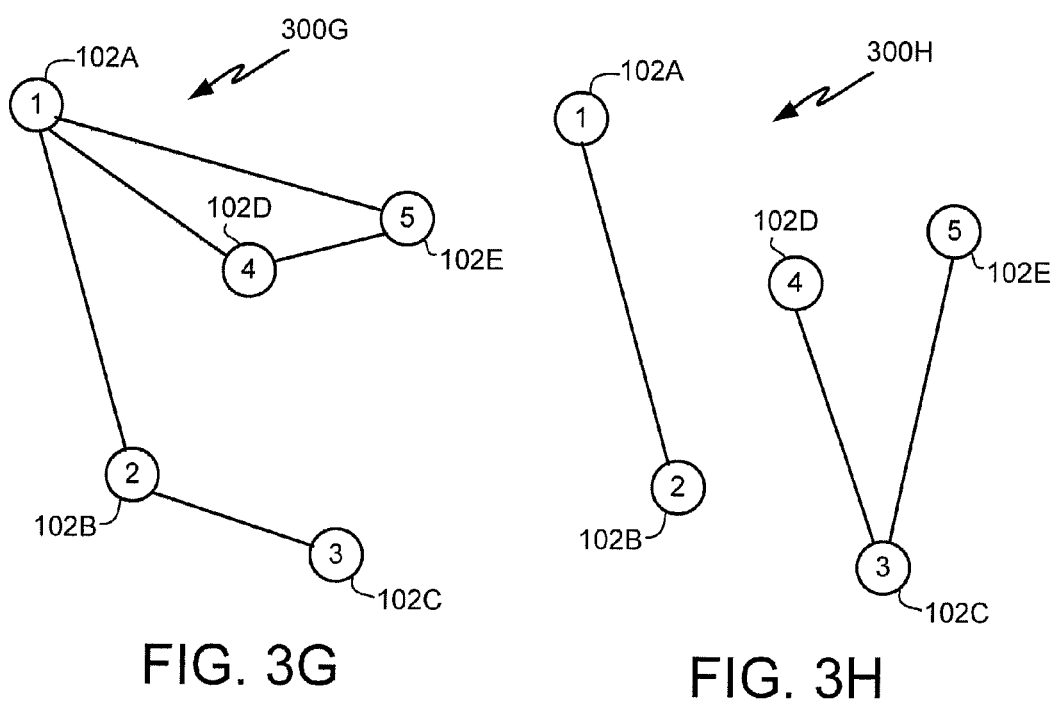

In step 514 of the method 500, a subset of topologies meeting the beaming capabilities of each node in the network is selected for further use in the method 500. In this regard, the subset of possible topologies may be selected by eliminating any topology that requires more beams to be available at a particular node than established for that node in step 512. For example, where the number of beams available at each node is two, a topology similar to that shown in FIG. 3G is not possible with such a restriction because in the topology 300G of FIG. 3G, the first node 102A communicates in the same stage with three other nodes 102B, 102D and 102E thereby requiring tri-beaming capability for the first node 102A. Thus, in such example, topology 300G of FIG. 3G would be eliminated and, of the exemplary topologies 300A-300H shown in FIGS. 3A-3H, the subset of topologies would include topologies 300A-300F and 300H. By way of further example, where the number of beams available at each node is one, topologies similar to those shown in FIGS. 3E, 3G and 3H are not possible with such a restriction because in the topologies 300E, 300G and 300H at least one node communicates in the same stage with two other nodes thereby requiring dual-beaming capability for that node. Thus, in such example, topologies 300E, 300G and 300H of FIGS. 3E, 3G and 3H would be eliminated and, of the exemplary topologies 300A-300H shown in FIGS. 3A-3H, the subset of topologies would include topologies 300A-300D and 300F.

In steps of method 500 subsequent to step 514, the topologies in the subset of topologies are utilized instead of all of the possible topologies identified in step 510. In this regard, in step 520 connection matrices are associated with each topology in the subset of topologies, and in step 530 sequences of topologies are established using the topologies in the subset of topologies. Thus, the results obtained in steps 540 through 580 are based on the subset of topologies that meet the beaming limitations of the nodes in the network. For the exemplary topologies 300A-300H shown in FIGS. 3A-3H and where the number of beams available at each node is limited to two beams in step 512, fully connected sequenced topology $C_G C_H$ is excluded from selection in step 580 since topology 300G would not be included in the subset of topologies, and fully connected sequenced topology $C_E C_F$ may be selected as the current staged topology in step 580 over fully connected sequenced topology $C_A C_B C_C C_D$ if exemplary weighting matrices W or W' are utilized in step 570.

Figure 6:
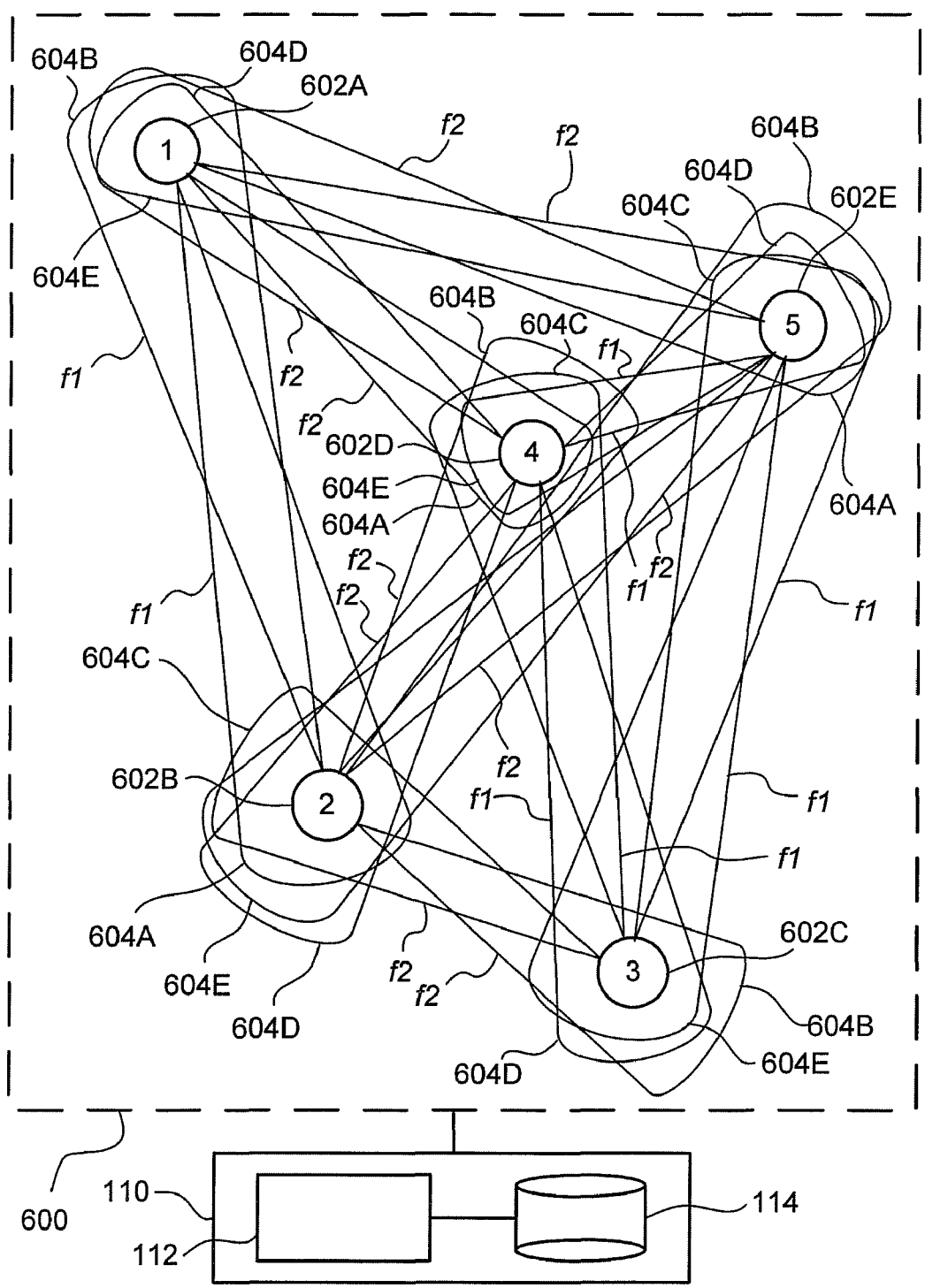
FIG. 6 shows another embodiment of a multi-node wireless communication network in which a staged topology may be implemented.

FIG. 6 shows another embodiment of a multi-node wireless communication network 600. The multi-node communication network 600 includes five nodes 602A-602E. In other embodiments, the multi-node communication network 600 may include fewer or more nodes than the five nodes 602A-602E illustrated. The communication network 600 may be controlled with a central controller unit 110 such as previously described in connection with the communication network 100 of FIG. 1 and/or in accordance with a distributed control scheme implemented among some or all of the nodes 602A-602E. Each node 602A-602E includes a multi-band transmitter and a multi-band receiver allowing each node 602A-602E to transmit signals on more than one frequency at a time and to receive signals on more than one frequency at a time. For example, as shown in FIG. 6, each node 602A-602E is able to transmit and receive signals 604A-604E on two frequencies $f_1$ and $f_2$. As shown, signals 604A-604E in one or more directions from a particular node 602A-602E during a given time period may be of the first frequency $f_1$ and signals 604A-604E in the other directions from a particular node 602A-602E during the same time period may be of the second frequency $f_2$, although all of the signals 604A-604E from a particular node 602A-602E during a given time period may be of the same frequency. Further, in other embodiments, one or more of the nodes 602A-602E may be able to transmit and receive signals on more than two frequencies or only on one frequency. As shown, the antennas at each node 602A-602E may be directional antennas thereby providing for directional signals beams 604A-604E, although in other embodiments the antennas at one or more of the nodes 602A-602E may be broadbeam or omni-directional antennas.

Figure 7A:
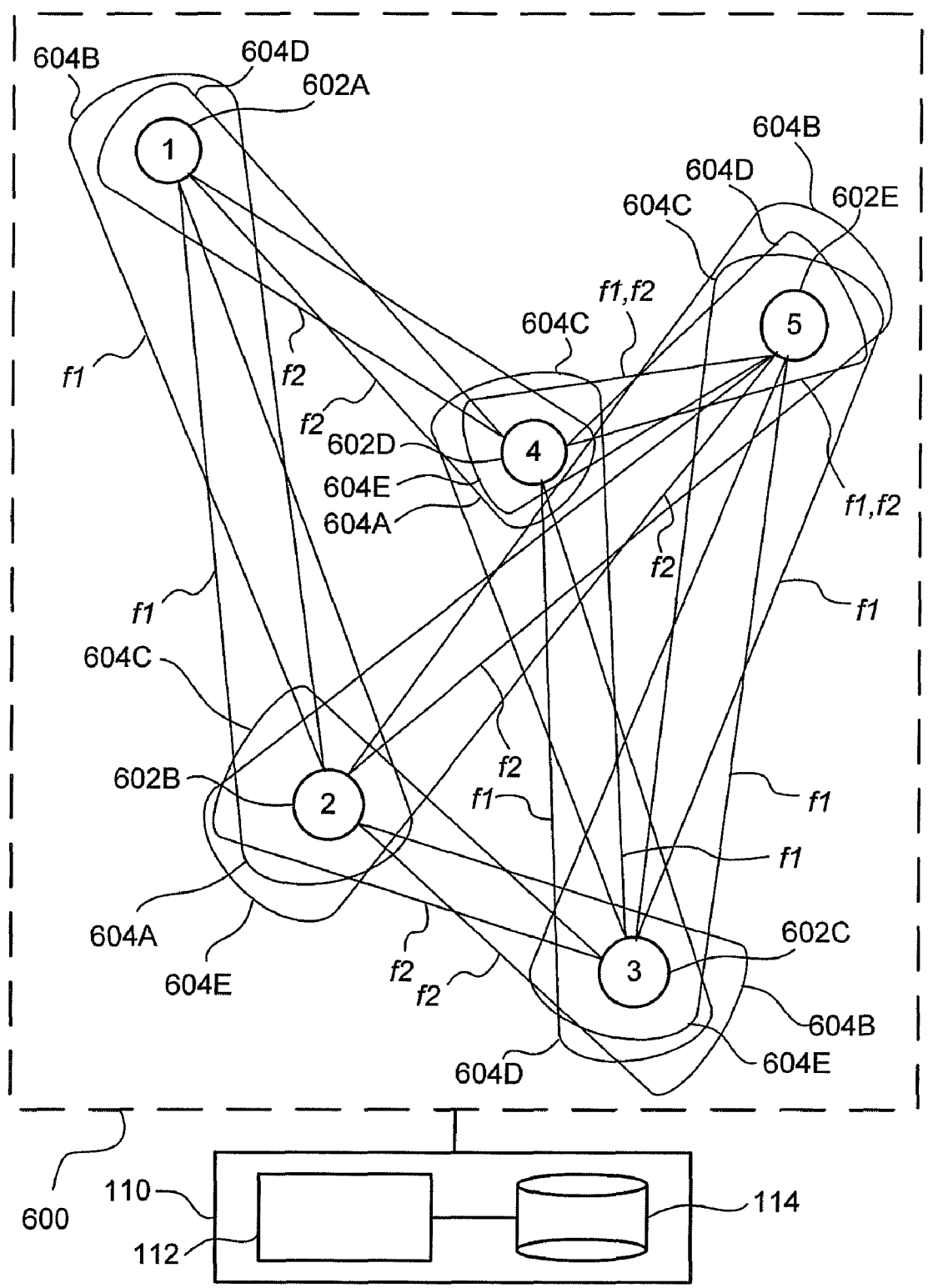
FIG. 7A shows an exemplary parallel staged topology for a wireless communication network such as shown in FIG. 6.

A communication network 600 such as shown in FIG. 6 allows for the implementation of a staged topology in which the various stages are run in parallel using the separate frequency bands without the need for time switching of antenna beams. In this regard, a current staged topology for a particular network may, for example, be determined in accordance with the method 200 of FIG. 2 or the method of 500 of FIG. 5. Regardless of how the current staged topology is determined, each stage in the current staged topology is assigned to a particular frequency. For example, if the fully connected sequenced topology $C_E C_F$ is selected as the current staged topology in step 280 of method 200 or step 580 of method 500, stage 1 shown in FIG. 4A may be assigned to frequency $f_1$ and stage 2 shown in FIG. 4B may be assigned to frequency $f_2$. Thereafter, communication links among the stage 1 nodes are accomplished using frequency $f_1$ and communication links among the stage 2 nodes are accomplished using frequency $f_2$ during the same time period thereby providing a parallel staged topology. An exemplary dual-frequency parallel staged topology for the exemplary fully connected sequenced topology $C_E C_F$ is illustrated in FIG. 7A.

Figure 7B:
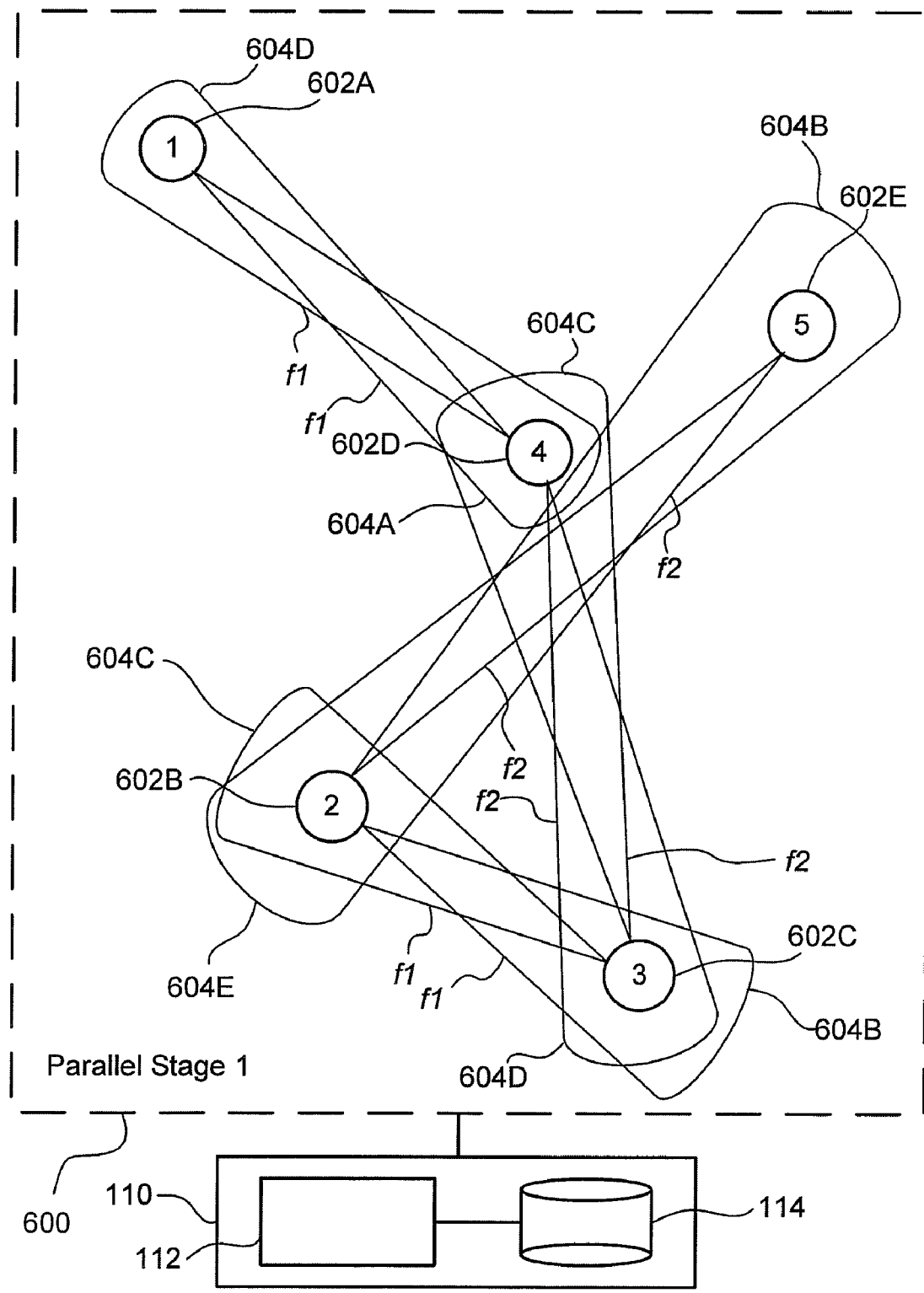
FIGS. 7B-7C show first and second stages of an exemplary sequence of parallel staged topologies for a wireless communication network such as shown in FIG. 6.
Figure 7C:
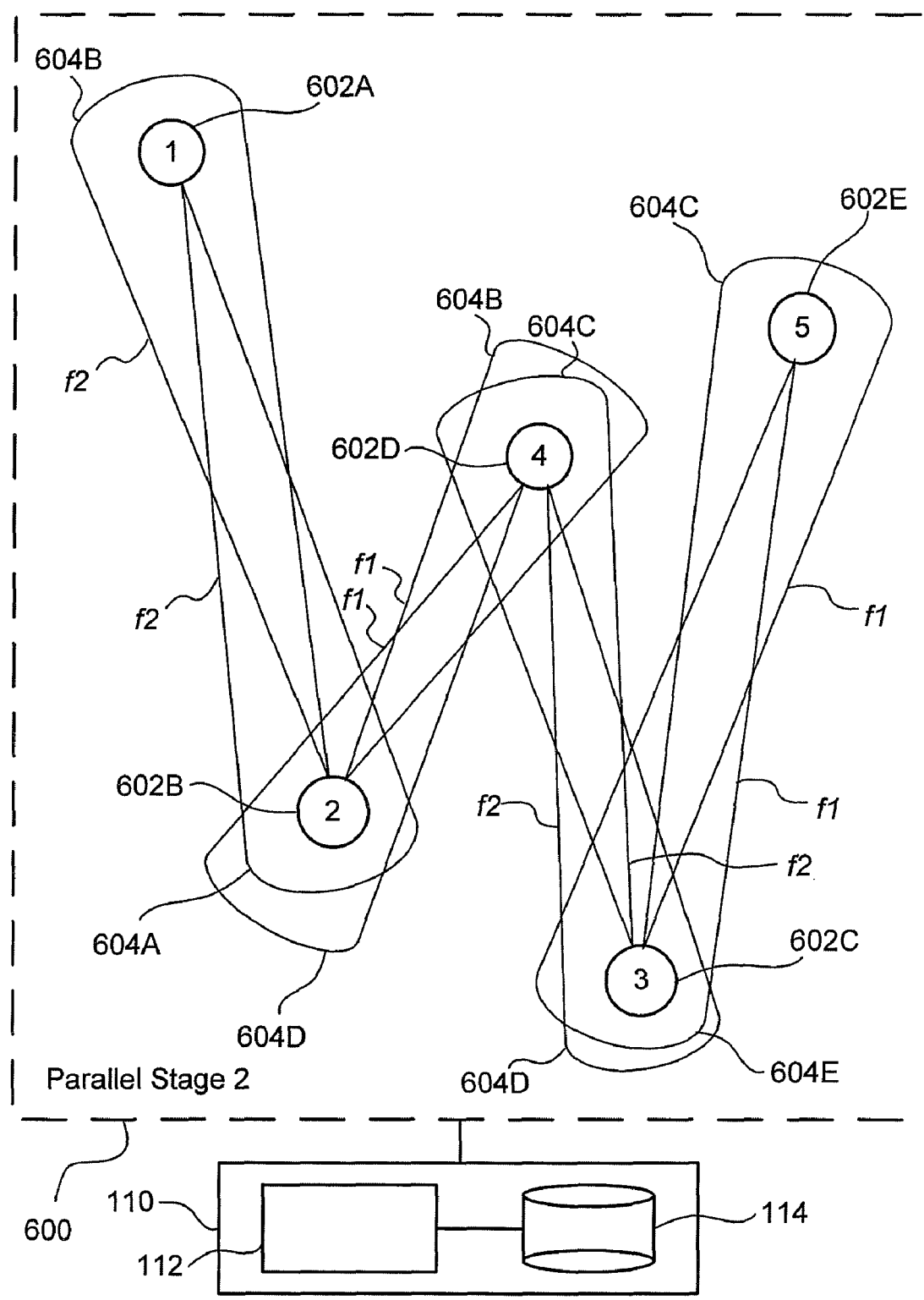

When the current staged topology changes, the frequency assignments may be changed. Where the current staged topology includes more than two stages to be implemented in parallel, the nodes in the network may need to be able to transmit and receive more than two frequencies at a time. However, it is possible to combine two or more parallel staged topologies into a sequence of parallel topologies. For example, FIGS. 7B-7C show a two stage parallel staged topology for the exemplary fully connected sequenced topology $C_A C_B C_C C_D$. In FIG. 7B, stages 1 and 2 corresponding to topologies 300A and 300B of FIGS. 3A and 3B are implemented in parallel using frequencies $f_1$ and $f_2$. In FIG. 7C, stages 3 and 4 corresponding to topologies 300C and 300D of FIGS. 3C and 3D are implemented in parallel using frequencies $f_1$ and $f_2$. Such a sequenced arrangement of parallel topologies allows a network with fewer transmission and reception frequencies than stages in a particular current staged topology to achieve some of the desirable characteristics of a parallel implementation of the staged topology.

When implementing a parallel staged topology, it may be desirable to achieve signal orthogonality for the stages. Orthogonality may be desirable in order to reduce crosstalk between the stages. Orthogonality may, for example, be achieved by proper frequency separation. Orthogonality may, for example, also be achieved through the use of code separation in transmitting information over the communication links. Further, near orthogonality provided by many signal classes (e.g., in frequency division and code division multiple access networks) may be sufficient.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A method of determining a staged topology for a communication network including a plurality of nodes, said method comprising:
    executing computer readable program code with a processing device to enable said processing device to perform the steps of:
        identifying a plurality of topologies comprising different subsets of available communication links among the nodes; and
        generating a staged topology for the network, wherein the staged topology comprises a sequence of two or more of the identified topologies and wherein information is communicatable among the nodes within the network via communication links arranged in accordance with the topologies included in the staged topology, wherein said generating comprises:
            associating a connection matrix with each identified topology, wherein the connection matrix associated with each topology includes a plurality of numerical elements $c_{ij}$, indexed by row i and column j where i represents the first of a pair of nodes in the network and j represents the second of a pair of nodes in the network, and wherein each numerical element $c_{ij}$ is a first value when there is a communication link between node i and node j and is a second value otherwise;
            establishing one or more sequences of topologies using the identified topologies;
            multiplying the connection matrices associated with the topologies in each sequence of topologies to obtain a sequenced connection matrix corresponding with each sequence of topologies;
            determining which sequences of topologies produce a fully connected communication network by determining which sequences of topologies have corresponding sequenced connection matrices without any second value elements;
            choosing only the sequenced connection matrices corresponding with the sequences of topologies that produce a fully connected communication network for further consideration;
            multiplying each sequenced connection matrix by a weighting matrix to obtain a total cost matrix corresponding with each sequence of topologies, wherein the weighting matrix includes a plurality of numerical elements $w_{ij}$, indexed by row i and column j where i represents the first of a pair of nodes in the network and j represents the second of a pair of nodes in the network, and wherein each numerical element $w_{ij}$ represents a relative cost associated with a communication link from node i to node j; and
            selecting one of the sequences of topologies as the staged topology based on the total cost matrices corresponding with each sequence of topologies.

2. The method of claim 1, wherein said executing further enables said processing device to perform at least one of:
    periodically updating the staged topology for the communication network; and
    updating the staged topology for the communication network upon occurrence of an update triggering event.

3. The method of claim 1 wherein the communication network is a wireless network and wherein one or more of the nodes in the wireless network is equipped with a directional antenna.

4. The method of claim 1 wherein the communication network includes a plurality of clustered nodes interconnected by a plurality of cluster-heads forming a virtual overlay network, and wherein the staged topology is implemented in at least one of the clusters of nodes.

5. The method of claim 1 wherein the communication network includes a plurality of clustered nodes interconnected by a plurality of cluster-heads forming a virtual overlay network, and wherein the staged topology is implemented to connect the cluster-heads.

6. The method of claim 1 wherein the communication network includes a hierarchical structure including a plurality of lower-level cluster-heads clustered into a cluster and associated with an upper level cluster-head, and wherein the staged topology is implemented in at least one of the levels.

7. A communication network implementing a staged topology, said network comprising:
    a plurality of separate nodes;
    a plurality of topologies comprising different subsets of available communication links among the nodes; and
    a staged topology comprising a sequence of two or more of the topologies, wherein information is communicatable among the nodes within the network via communication links arranged in accordance with the topologies included in the staged topology;
    the staged topology being selected from one or more sequences of topologies based on total cost matrices corresponding with each sequence of topologies, wherein each sequence of topologies corresponds with a sequenced connection matrix obtained by multiplying connection matrices associated with the topologies in each sequence of topologies, wherein the connection matrix associated with each topology includes a plurality of numerical elements $c_{ij}$, indexed by row i and column j where i represents the first of a pair of nodes in the network and j represents the second of a pair of nodes in the network, wherein each numerical element $c_{ij}$ is a first value when there is a communication link between node i and node j and is a second value otherwise, wherein the total cost matrices are obtained by multiplying each sequenced connection matrix by a weighting matrix, wherein the weighting matrix includes a plurality of numerical elements $w_{ij}$, indexed by row i and column j where i represents the first of a pair of nodes in the network and j represents the second of a pair of nodes in the network, and wherein each numerical element $w_{ij}$ represents a relative cost associated with a communication link from node i to node j.

8. The communication network of claim 7 wherein the staged topology produces a fully connected communication network.

9. The communication network of claim 7 wherein the staged topology for the communication network is periodically updated or is updated upon occurrence of an update triggering event.

10. The communication network of claim 7 wherein the communication network is a wireless network and wherein one or more of the nodes in the wireless network is equipped with a directional antenna.

11. The communication network of claim 7 wherein the communication network includes a plurality of clustered nodes interconnected by a plurality of cluster-heads forming a virtual overlay network, and wherein the staged topology is implemented in at least one of the clusters of nodes.

12. The communication network of claim 7 wherein the communication network includes a plurality of clustered nodes interconnected by a plurality of cluster-heads forming a virtual overlay network, and wherein the staged topology is implemented to connect the cluster-heads.

13. The communication network of claim 7 wherein the communication network includes a hierarchical structure including a plurality of lower-level cluster-heads clustered into a cluster and associated with an upper level cluster-head, and wherein the staged topology is implemented in in at least one of the levels.

14. A system for implementing a staged topology in a communication network including a plurality of nodes, said system comprising:
   computer readable program code stored on a data storage device, the computer readable program code including:
   computer readable program code enabling a computer processor to identify a plurality of topologies comprising different subsets of available communication links among the nodes;
   computer readable program code enabling the computer processor to associate a connection matrix with each identified topology;
   computer readable program code enabling the computer processor to establish one or more sequences of topologies using the identified topologies;
   computer readable program code enabling the computer processor to multiply the connection matrices associated with the topologies in each sequence of topologies to obtain a sequenced connection matrix corresponding with each sequence of topologies;
   computer readable program code enabling the computer processor to multiply each sequenced connection matrix by a weighting matrix to obtain a total cost matrix corresponding with each sequence of topologies; and
   computer readable program code enabling the computer processor to select one of the sequences of topologies as the staged topology based on the total cost matrices corresponding with each sequence of topologies.

15. The system of claim 14 further comprising:
   computer readable program code enabling the computer processor to determine which sequences of topologies produce a fully connected communication network; and
   computer readable program code enabling the computer processor to choose only the sequenced connection matrices corresponding with the sequences of topologies that produce a fully connected communication network for further consideration.

16. The system of claim 15 further comprising at least one of:
   computer readable program code enabling the computer processor to periodically update the staged topology for the communication network; and
   computer readable program code enabling the computer processor to update the staged topology for the communication network upon occurrence of an update triggering event.

17. The system of claim 14 wherein the computer processor is included in a controller unit that controls operation of the communication network.

18. The system of claim 14 wherein the connection matrix associated with each topology includes a plurality of numerical elements $c_{ij}$, indexed by row i and column j where i represents the first of a pair of nodes in the network and j represents the second of a pair of nodes in the network, and wherein each numerical element $c_{ij}$ is a first value when there is a communication link between node i and node j and is a second value otherwise, and wherein the weighting matrix includes a plurality of numerical elements $w_{ij}$, indexed by row i and column j where i represents the first of a pair of nodes in the network and j represents the second of a pair of nodes in the network, and wherein each numerical element $w_{ij}$ represents a relative cost associated with a communication link from node i to node j.

19. The system of claim 14 wherein the computer readable program code that enables the computer processor to select one of the sequences of topologies as the staged topology only selects a sequence of topologies as the staged topology that produces a fully connected communication network.

20. The system of claim 14 wherein the communication network is a wireless network and wherein one or more of the nodes in the wireless network is equipped with a directional antenna.

* * * * *

UNITED STATES PATENT AND TRADEMARK OFFICE
CERTIFICATE OF CORRECTION

PATENT NO. : 7,756,062 B2  Page 1 of 1
APPLICATION NO. : 12/016116
DATED : July 13, 2010
INVENTOR(S) : Ross et al.

It is certified that error appears in the above-identified patent and that said Letters Patent is hereby corrected as shown below:

Column 17, line 35, delete the second occurrence of "in".

Signed and Sealed this

Twenty-eighth Day of September, 2010

David J. Kappos
*Director of the United States Patent and Trademark Office*